United States Patent [19]

Tanaka et al.

[11] Patent Number: 5,047,448

[45] Date of Patent: Sep. 10, 1991

[54] ANTIMICROBIAL-SHAPED ARTICLE AND A PROCESS FOR PRODUCING THE SAME

[75] Inventors: Kazuhiko Tanaka; Kiyoshi Hirakawa, both of Kurashiki; Kiyoshi Takisawa, Kurita; Takao Akagi; Masao Kawamoto, both of Kurashiki, all of Japan

[73] Assignee: Kuraray Company Limited, Kurashiki, Japan

[21] Appl. No.: 331,350

[22] Filed: Mar. 31, 1989

[30] Foreign Application Priority Data

Sep. 27, 1988 [JP] Japan ................................ 63-243618

[51] Int. Cl.$^5$ ...................... C08L 77/00; C08L 67/02
[52] U.S. Cl. ..................................... 523/122; 524/403; 524/439; 524/440; 524/605; 524/606; 428/397
[58] Field of Search ............... 523/122; 524/403, 439, 524/440, 605, 606

[56] References Cited

U.S. PATENT DOCUMENTS

| | | | |
|---|---|---|---|
| 4,191,580 | 3/1980 | Beiter et al. | 523/122 |
| 4,314,850 | 2/1982 | Watanabe et al. | 523/122 |
| 4,376,181 | 3/1983 | Suenobu et al. | 523/122 |

OTHER PUBLICATIONS

Patent Abstracts of Japan, vol. 13, No. 579 (C-668) [3927], 20th Dec. 1989; & JP-A-1 242666 (Kuraray Co. Ltd.) 27-29-1989.
Patent Abstracts of Japan, vol. 10, No. 185, (C-357) [2241], 27th Jun. 1986; & JP-A-61 34053 (Kuraray Co., Ltd) 18-02-1986.
Patent Abstracts of Japan, vol. 12, No. 172 (c-497) [3019], 21st May 1988; & JP-A-62 282018 (Akio Sawashita) 07-12-1987.
Patent Abstracts of Japan, vol. 11, No. 267 (C-443) [2714], 28th Aug. 1987; & JP-A-62 68833 (Showa Denko K.K.) 28-03-1987.

*Primary Examiner*—Lewis T. Jacobs
*Attorney, Agent, or Firm*—Oblon, Spivak, McClelland, Maier & Neustadt

[57] ABSTRACT

The present invention provides shaped articles incorporating mixed particulate metals comprising fine particles of a first metal or a compound thereof capable of releasing a metal ion having a first antimicrobial function, and a second metal having an ionization tendency different from that of the first metal or a compound thereof capable of releasing a metal ion having a second antimicrobial function, together with a polyester compound having specific properties, dispersed therein, and thus being capable of effectively releasing gradually over a long period a trace amount of the metal ions having an antimicrobial function from the particulate metals and maintaining an excellent antimicrobial function. The fibers according to the present invention also have excellent durability of the antimicrobial function and have excellent mildew resistance, in repeated washings and in service.

9 Claims, 1 Drawing Sheet

FIGURE 1.

ANTIMICROBIAL-SHAPED ARTICLE AND A PROCESS FOR PRODUCING THE SAME

BACKGROUND OF THE INVENTION

1. Field of the Invention

The present invention relates to shaped articles having an antimicrobial function and also excellent resistance to washing.

2. Description of the Background

A variety of bacterial and mildew adhere to the human body and/or textiles via various media and propagate there. Upon propagation, they irritate human skin, deteriorate textiles, and smell bad, for example. In particular, where textiles of synthetic fibers, which absorb only a minor amount of sweat, are put on the human body, bacterial will propagate on the skin or clothing to which the sweat adheres, and then cause putrefaction, generating an unpleasant smell. Since polyester and/or polyamide fibers are widely used for making various types of clothing such as uniforms, Japanese style clothing and sports wear, as well as bedding and interior textiles, it would be extremely desirable to be able to prepare polyester or polyamide fiber textiles which are clean and do not smell badly, and which are hence safe and comfortable to wear.

At one time, organic tin compounds or organic mercury compounds were applied to fibers in order to impart an antimicrobial function to the fiber. Unfortunately, the toxicity of such compounds prevented most of these compounds from ever being used.

In the after-processing of textiles, organosilicon quaternary ammonium salts, for example, have been used as antimicrobial and mildew-resistant agents with greater safety. For example, Japanese Patent Application Laid-Open No. 51874/1982 discloses a carpet having adsorbed thereon an organosilicon quaternary ammonium salt and a process for producing the same. However, while silicon-associated quaternary ammonium salts are reactive with cellulosic fibers, and hence the cellulose textiles treated with them exhibit a wash-resistant antimicrobial function, these salts do not bond firmly with synthetic fibers and synthetic textiles treated with the same exhibit only a temporary antimicrobial function.

It is known that compounds of silver, copper and zinc, for example, which when wet generate silver ions, copper ions and zinc ions, respectively, have an antimicrobial function. For example, aqueous silver nitrate solution has been widely used as an antiseptic solution or sterilizing solution. However, a solution-form agent is inconvenient to handle and has only limited use. Therefore, if an ion or a salt of silver, copper or zinc were incorporated in a polymer, the polymer mi9ht be expected to have little such drawbacks and might be expected to be used in a wide variety of fields. For example, a method is proposed in Japanese Patent Application Laid-Open No. 147220/1979 which entails mixing a compound of a metal such as silver, copper or zinc, for example, in a polymer, and then forming the polymer into fiber. Further, a method is proposed in Japanese Patent Application Laid-Open No. 133235/1984 in which solid zeolite particles ion-exchanged with silver ion or copper ion are incorporated into organic polymers These methods however have a number of associated problems. For example, a metal compound exerts too great an influence on polymers, thus limiting the end-use of the final products. Also, there occurs operation troubles in the fiber manufacturing process, such as frequent filament breakage at spinning, shortening of spinneret pack filter life due to clogging, and frequent filament breakage at drawing process rendering the obtained drawn yarn very fluffy. However, even when the above problems are not encountered, the simple incorporation of a metallic ion into a polymer can not produce a sufficient effect, since migration of the inside metal ion having an antimicrobial function to the surface of the fiber is too slow, thereby lowering the level of the antimicrobial function of the fiber.

In Japanese Patent Application No. 123474/1981, a method is proposed which entails adhering a complex containing a compound of copper, silver or zinc and casein, which has been insolubilized in water, onto the surface of fiber. The complex on the fiber is resistant to washing because it is insoluble in water. However, in order to insolubilize casein, formaldehyde must be used, and hence there is the disadvantage that textiles made of such fiber may release formaldehyde during use.

Thus, a need continues to exist for synthetic shaped articles having an antimicrobial function, which maintain the inherent characteristics of polymers employed and which also have excellent resistance to washing and wearing, and, in particular, whose antimicrobial and mildew-resistant function does not decrease even after washing with water or with warm water.

SUMMARY OF THE INVENTION

Accordingly, it is an object of the present invention to provide an antimicrobial-shaped article having excellent resistance to washing and durability.

It is also an object of the present invention to provide a process for producing the above-described antimicrobial-shaped article.

These objects and others which will become apparent from the description below are provided by an antimicrobial-shaped article having high durability which contains a thermoplastic shaped article, having a sufficiently high melting point to impart thermal resistance thereto, incorporating therein a mixture of:

a) fine particles of a first metal or a compound thereof having an average particle diameter of not more than $5\mu$, and being capable of releasing a metal ion having a first antimicrobial function a);

b) fine particles of a second metal with an ionization tendency different from that of the first metal or its compound having an average particle diameter of not more than $5\mu$, and being capable of releasing a metal ion having a second antimicrobial function b); and c) a liquid polyester compound having a melting point of not higher than 10° C. and a viscosity at 25° C. of at least 10 poises.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the present invention "shaped article" means any shaped articles including linear articles as represented by fibers, film-shape articles, tape-shape articles, piping, and various containers, for example. Hereinbelow the description is given for convenience, as an example, on fibers, which require severe production conditions.

It was found, unexpectedly, that a fiber obtained from a polymer which simply contains dispersed therein particulate metal does not exhibit a sufficient antimicrobial function.

Antimicrobial function is evaluated generally by (1) shake-flask method, (2) determination of the number of bacteria and (3) halo-test. It is said that an antimicrobial function is sufficient when, for example, the bacteria reduction ratio determined by shake-flask method is at least 70%. Then, if the bacteria reduction ratio is less than 70%, the antimicrobial function will be insufficient, causing microorganism propagation resulting in putrefaction and generating a sweat-like fiber smell, thus, lowering the deodorant effect. Textiles containing such fibers would be designated as being defective among antimicrobial textile products.

A fiber formed from a polymer having only particulate metallic copper dispersed therein has a bacteria reduction ratio of only 30 to 40% and thus is in adequate as an antimicrobial fiber. It appears that this may be because a fiber does not exhibit a sufficient antimicrobial function unless a minute amount of copper ion is always present on the fiber surface and that the simple incorporation of dispersed metallic copper in the fiber does not result in the copper ion released from the metallic copper smoothly migrating outward to the fiber surface. As a model test for checking this assumption, a fiber having metallic copper powder simply adhered to the surface thereof in the same amount as that incorporated in the polymer was evaluated for antimicrobial function. This fiber exhibited a sufficient antimicrobial performance. However, the copper powder simply adhering to the fiber surface readily comes off during use and, hence, such fiber has little, if any, wash-resistance.

The present inventors have determined that by incorporating in a polymer a specific polyester compound together with a particulate metal dispersed therein it is possible to achieve an excellent sterilizing function of the metal ion over a long period of use even by repeated washing.

However, the present inventors then further discovered that although the excellent sterilizing function was maintained after 10 cycles of washing and drying, it gradually decreases when actually put on the human body for a long period.

The present inventors then studied intensively the problem of how to have a fiber containing a polyester and/or polyamide containing a particulate metal dispersed therein exhibit an excellent metal ion sterilizing effect over a long period while maintaining sufficient resistance to washing and durability in actual service, i.e., how to obtain a safe antimicrobial fiber having a superior performance.

Quite surprisingly, it has now been discovered that the above object can be achieved by incorporating into a polymer a mixture of fine particles of a first metal or a compound thereof having an average particle diameter of not more than about 5μ, and being capable of releasing a metal ion having a first antimicrobial function a), and fine particles of a second metal having an ionization tendency different from that of the first metal or a compound thereof having an average particle diameter of not more than about 5μ, and being capable of releasing a metal ion having a second antimicrobial function b), together with a polyester compound having specific properties.

The polyester compound used herein must be one that exhibits fluidity at room temperature and thus has a melting point of not higher than about 10° C. and further has a viscosity at 25° C. of at least about 10 poises. Since the polyester is compatible with and readily mixed with the polyester or polyamide in a homogeneous dispersion and is fluid at room temperature, it appears that the polyester conveys the ions released into the polymer from the metals (A) and (B) to the surface of the fiber, instead of enclosing them inside the fiber. Thus, a system appears to be established in which the metal ions exhibiting a sterilizing function are gradually and almost perpetually released to the surface of a fiber via passages made of a polyester compound contained in the fiber, primarily by the presence of the mixed fine particles of the metals together with the described polyester compound.

It is not clear why the above system gives an antimicrobial function which is durable throughout long-period service, however, there appears to be a synergistic effect caused by different ionization tendencies. That is, although the actual mechanism is unknown at the moment, it is thought that the presence of two metals having different ionization tendencies accelerates the generation of the one metal ion, or that the electrochemical action of an electromagnetic field produced by the action of at least two different metal ions contributes in some way or another to the durability of the antimicrobial function. Further, since polyester compounds are insoluble in water and thus have sufficient water resistance, the antimicrobial function does not decrease at all and is well maintained even after the washing. The above two effects are most important effects in accordance with the present invention.

When a polyester compound having no fluidity at room temperature, i.e. being solid and having a melting point above room temperature, is used, there is obtained, as described in detail in the following Examples a greatly reduced antimicrobial effect. It appears that since the polyester compound is present as a solid dispersed in the fiber, it does not function to convey the metal ion to the fiber surface, or, to gradually release the metal ion outward.

The viscosity of the polyester compound used herein is preferably at least about 10 poises. It is observed that, where the viscosity is less than 10 poises, the level of the antimicrobial function after hot water washing is somewhat decreased. This is a novel observation which had not been previously known. Although it is not clear at the moment, it appears that when the polyester compound has too low of a viscosity, the compound itself migrates, whereby the compound tends to leak out from inside the fiber at hot water washing, and the water resistance of the polyester compound decreases. The polyester compounds preferably used are commercial polyester-related plasticizers such as the ADK CIZER series available from Adeka Argus Co., or the POLYCIZER series available from Dainippon Ink & Chemicals Inc., for example. Among the above polyester compounds, particularly preferred in terms of cost as well as of properties, are those comprising principally as the acid component, sebacic acid, adipic acid or phthalic acid and a glycol component suitably selected thereto.

It is necessary that both the fine particles a) and the fine particles b) used in the present invention be of an average particle diameter not exceeding about 5μ. If the average particle diameter exceeds 5μ, the polymer incorporating the particles tends to cause filter clogging and filament breakage, for example, during the melt-spinning process, and is difficult to use. In particular, when the application to materials for various clothings and beddings, for example, is attempted, there is also required a fine denier fiber having a single filament fineness of about 1 denier. In the production of such a fine fiber, particles of a larger size will also cause frequent breakage of filaments, which is not preferred. The average particle diameter of the fine particles a) and the fine particles b) used in the present invention therefore are preferably less than about 5 and more preferably, less than about 1μ. Further, the fine particles (e.g. particulate metallic copper) are preferably of high purity, as well as a round-shape having a sharp distribution of the particle diameter, for the purpose of achieving as homogeneous dispersion in a fiber, examples of such fine particles being MFP Powder available from Mitsui Mining and Smelting Co., zinc white powder, SAZEX available from Sakai Chemical Industry Co. etc.

Metallic copper releases from its crystal structure a trace amount of cupric ion and it is known that the trace amount of the cupric ion has a sterilizing function. It is believed that this was first known when Karl Wilhelm von Nageli, a famous botanist, discovered that a trace amount of one ten millionth (0.1 ppm) of cupric ion kills spirogyra. It is believed that, in principle, cupric ion passes through the cell-wall of a bacterium and chemically binds the —SH group of enzyme inside the cell, thereby deactivating the enzyme activity to eventually stop the metabolism of the cell and thus killing it. While a trace amount of cupric ion exhibits an excellent sterilizing function, it appears that the cupric ion is not harmful to the human body as long as it is present in a minute amount. Conversely, copper is, as a "mineral", one of the indispensable metals for the living body, the shortage of which reportedly causes anaemia or causes bone fragility. Unless a minute amount of copper is present in the body, hemoglobin is not easily produced no matter how much iron is present, and, moreover, erythrocytes are formed having a short life thereby causing anaemia. Accordingly, metallic copper is not harmful to the human body in terms of its function of releasing a minute amount of cupric ion and has an excellent sterilizing function. Thus, metallic copper is most suited for the purposes of the present invention.

In the case where metallic copper or a copper compound is used as the fine particles a), there can be used particularly, as another metal having an ionization tendency different from that of copper, a simple substance or a compound of a metal selected from the group consisting of aluminum, silver, zinc and iron and compounds thereof.

The metal powder incorporated as an antimicrobial agent is preferably white in color, since the obtained fiber is thereby not colored strangely, which fact widens the fields of end-use of the fiber. For such purpose, metallic zinc or a zinc compound can be used as the white fine particles a), while another white item having an ionization tendency different from zinc can be selected from the simple substance or a compound of silver, aluminum or iron.

As regards the incorporation amount in the fiber, it has been found that preferable results are obtained by incorporating in and dispersed into the fiber a mixture of fine particles a) and b) with a polyester compound in a weight ratio of about 5:95 to 80:20, the incorporation ratio of the particulate metals (fine particles a) +fine particles b) being about 0.1 to 10% by weight based on the weight of the fiber, and that of the polyester compound being about 0.1 to 10% by weight on the same basis. The weight ratio of fine particles a) and b) is in the range of from about 1:99 to 99:1, and it has been found that a sufficient durability in service is obtained whichever may be richer in amount as long as the two are mixed with each other.

Further, an integral item comprising both fine particles a) and b), for example an alloy of metallic copper and metallic zinc, can well exhibit the function aimed at by the present invention, as long as the ratio of the metal(s) and/or metal compound(s) are within the above range.

Where the particulate metal is incorporated in a relatively small amount, a larger amount of the polyester compound is preferably added in order to increase the amount of the metal ions gradually released to the fiber surface; while where a larger amount of the particulate metals is incorporated, a smaller amount of the polyester compound may work. The antimicrobial function naturally increases as the total incorporation increases but, a larger incorporation amount will cause generation of much fluff and a high filament breakage ratio in the fiber manufacturing process. It therefore is necessary to select the mixing ratio and the incorporation amount in the fiber of the particulate metals and the polyester compound depending on the fineness of the fiber produced, within the above range.

The "polyesters" herein means polyesters comprising as a principal component polyethylene terephthalate or polybutylene terephthalate, and are fiber-forming polyesters derived from an aromatic acid such as terephthalic acid, isophthalic acid, naphthalene-2,6-dicarboxylic acid, phthalic acid or α,β-(4-carboxyphenoxy)ethane, an aliphatic acid such as adipic acid or sebacic acid, or esters of the foregoing; and a diol such as ethylene glycol, diethylene glycol, 1,4-butanediol, neopentyl glycol, cyclohexane-1,4-dimethanol, polyethylene glycol, or polytetramethylene glycol. The polyesters preferably have in their structure at least 80 mol%, more preferably at least 90 mol% of polyethylene terephthalate units or polybutylene terephthalate units, and also preferably have a melting point of at least 200° C. If a polyester having a lower melting point is used, the obtained fiber will be of limited end use as a textile material for clothing and the like due to its insufficient thermal resistance, for example, which is not preferred. The polyesters may contain small amounts of additives, e.g. delustering agents such as titanium dioxide, antioxidants, optical whitening agents, stabilizers, ultraviolet absorbers, etc.

The "polyamides" herein means polyamides comprising principally nylon 6, nylon 6,6 or metaxylylenediamine nylon, which may be copolyamides comprising a small amount of a third component. The polyamides must have a melting point of at least 200° C.

The fibers according to the present invention may be yarns of a form resembling a pentagon or hexagon through a higher-order processing such as false-twist crimping, or be filaments having a cross sectional shape of trilobal, T-shape, tetralobal, pentalobal, hexalobal, heptalobal or octalobal, for example, while fully exhibiting the antimicrobial function. Further, the fibers may be composite fibers of so-called sheathcore configuration or side-by-side configuration. Such composite fibers can well produce the effect of the present invention insofar as the polymer incorporating a mixture of particulate metals and a polyester compound occupies at least 20% the cross sectional area of a filament and is at the same time present partly on the surface of the filament.

In order to eliminate such troubles as a decrease in polymer viscosity, occurrence of side reactions and decomposition of the polyester compound, for example, is a process which entails adding a mixture of particulate metals and a polyester compound to a polymer in the course after the completion of the polymerization and before the extrusion-spinning, kneading them, and thereafter extruding the kneaded melt through a spinneret. Where pellets are once formed after the polymerization, the mixture of particulate metals and a polyester compound may be added into the polymerization vessel after the completion of polymerization, and kneaded and agitated to be pelletized. However, it is preferred that the mixture be added at a specified rate into a melted polymer flow in the spinning process, and then the polymer containing the mixture is kneaded with a static mixer, followed by extrusion through a spinneret into filaments. Where the mixture is added to the polymerization vessel, and kneaded and agitated to pelletization, there occur such troubles as a decrease of polymer viscosity, difficulty in obtaining a homogeneous dispersion of the mixture, contamination of the polymerization vessel, and the like. It is not preferred to add the mixture before the polymerization together with a monomer, which process will cause troubles such as occurrence of side reactions.

The process of the present invention is a process for producing antimicrobial shaped articles having excellent durability, which entails mixing fine particles of a first metal or a compound thereof having an average particle diameter of not more than about $5\mu$, and being capable of releasing a metal ion having antimicrobial function a) and fine particles of a second metal having an ionization tendency different from that of the first metal or a compound thereof having an average particle diameter of not more than about $5\mu$, and being capable of releasing a metal ion having antimicrobial function b), with a liquid polyester compound having a melting point of not higher than 10° C. and a viscosity at 25° C. of at least 10 poises, then adding the mixture to a melt polymer after the completion of polymerization and before the extrusion or molding, kneading them, and then extruding the kneaded blend through a die into a shaped article.

For a process comprising continuously supplying a melted polymer to a spinneret without any pelletization step, it is preferred that a mixture of particulate metals and a polyester compound be supplied at a constant rate into the melted polymer flow at a stage until just before the spinning process, and the polymer having incorporated the mixture be kneaded with a static mixer, followed by extrusion through a spinneret.

Where a static mixer is used for kneading, it is important that the kneading be done with a static mixer having a specified number or more of the elements. When there is used, among several static mixers currently in use, for example, one available from Kenics Co., the wings of which are each twisted 180° around the center axis and are arranged at positions each shifting by 90° one after another, and which has function of dividing a melt passing n elements into $2^n$ layers, the mixer must have at least 15 elements. If it has less than 15 elements, kneading of additives with the polymer will not be sufficiently done, thereby causing frequent filament breakages and wrappings around spinning rolls and also decreasing the drawability of the as-spun filaments, which are not preferred from the standpoint of operatability. For the purpose of improving the operatability, the number of elements is preferably at least 15, that is, division into $2^{20}$ layers should at least be done, and more preferably at least 20, that is, the division into at least $2^{15}$ layers Where a static mixer other than that available from Kenics Co. is used, it must be one with the number of elements being set corresponding to a division into $2^{15}$ layers or more. High-Mixer available from Toray Co. and Ross ISG Mixer available from Charess & Ross Co. divide a melt passing n elements into $4^n$ layers, and the required number of elements is hence at least 8, more preferably at least 10.

Figure 1:
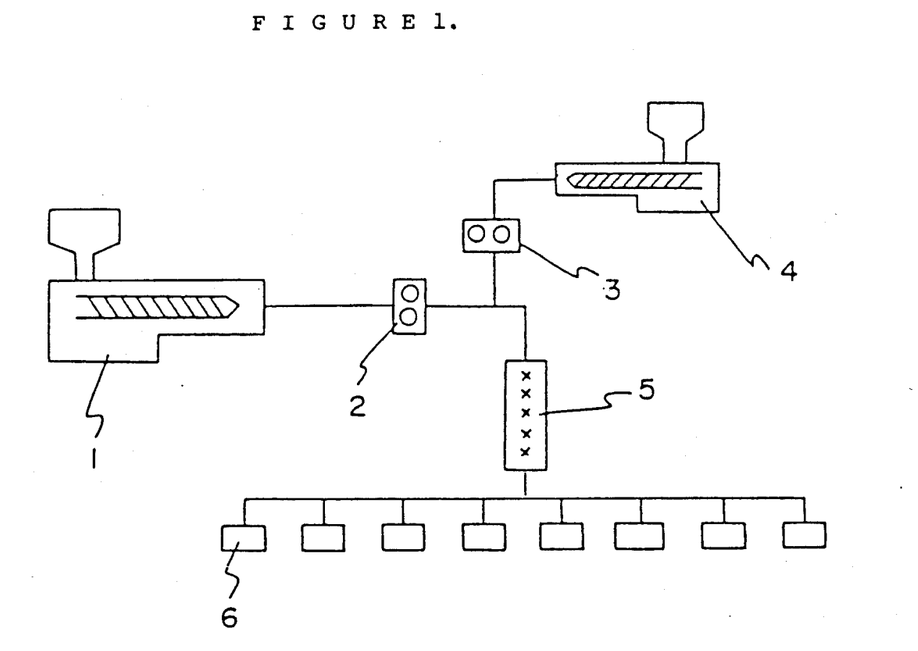
FIG. 1 is a schematic drawing showing an example of the production process of the present invention.

FIG. 1 shows an example of the production process according to the present invention. A melted polymer flow extruded through a melt-extruder 1 is metered in a specified amount through a meter 2. A mixture of particulate metals and a polyester compound are fed from an additive feeder 4, metered in a specified amount through a meter 3, and then added into the polymer melt flow metered with a meter 2. Then, the mixture and the polymer are kneaded through a static mixer equipped with a specified number of elements, followed by extrusion through a spinneret pack 6 into filaments. The static mixer may be located in a polymer flow line, or in the spinneret pack, or it may be dividedly mounted in a polymer flow line and in the spinning pack.

The shaped article according to the present invention incorporates a mixture of mixed particulate metals comprising fine particles of a first metal or a compound thereof capable of releasing a metal ion having an antimicrobial function and fine particles of a second metal having an ionization tendency different from that of the first metal or a compound thereof capable of releasing a metal ion having an antimicrobial function, with a polyester compound, dispersed therein, and thus effectively releases gradually a trace amount of the metal ions having an antimicrobial function from the particulate metals and which maintains an excellent antimicrobial function Further, when the shaped article of the present invention is a fiber, the antimicrobial function and mildew resistance of textiles utilizing the fiber do not decrease throughout repeated washing and service. Such fibers can, for example, be used for socks and the like which require a high resistance to washing, and then they can well suppress the propagation of bacteria and exhibit a deodorant function.

The present invention will now be further illustrated by the following examples which are provided solely for the purpose of illustration and are not intended to be limitative.

EXAMPLES

Evaluation of the sterilization effect and washing test in Examples were done according to the procedures given below.

Determination of the bacteria reduction ratio

Method: Shake-flask method

Test bacterium: staphylococcus aureus FDA 209p

PROCEDURE

An Ehrenmeyer flask is charged with a prescribed amount of test solution containing the bacteria and then with 1.5 g of a test specimen. The flask with the contents is then stirred by 8-shape stirring at a rate of 80 rpm at 25° C. for 1 hour. Then the number of the bacteria in the flask is measured in the usual manner. The bacteria reduction ratio is calculated as:

Bacteria reduction ratio $(\%) = B-A/B \times 100$ wherein A is the number of bacteria per 1 ml in the flask after the stirring, and B is the number of bacteria per 1 ml in the flask before the stirring.

WASHING TEST

JIS L0217-103 is applied here. A washing solution is prepared by adding and dissolving a synthetic washing agent in water at 40° C. at a ratio of 2 g per 1 liter of water. Into this washing solution a test specimen and, if necessary, other cloths are put in such amounts that will make the bath ratio 1:30, and the washing operation is started. After 5 minutes of washing, the washing is stopped, and the specimen and the other cloths are squeezed to remove the washing solution in a dewaterer. The washing solution in the washing machine is replaced with fresh water at room temperature and rinsing is conducted for 2 minutes, followed by dewatering. Again rinsing is conducted for 2 minutes, and then the specimen is air-dried. An antimicrobial cloth is worn by a man for 8 hours in a day and then subjected to the above described washing treatment. This procedure is repeated 10 times, and thereafter the cloth is evaluated.

EXAMPLE 1

A polyethylene terephthalate having an $[\eta]$ (an intrinsic viscosity measured on a solution in a mixed solvent of 1/1 phenol/tetrachloroethane in a 30° C. constant temperature bath with Uberohde viscosimeter) of 0.65 dl/g and containing 0.5 wt% of $TiO_2$ was extruded through a 40-mm $\phi$ extruder. Separately, a mixture was prepared by first mixing particulate metallic copper having an average particle diameter of $0.3\mu$ and particulate metallic silver having an average particle diameter of $0.5\mu$ in a weight ratio of 9:1, and then the mixed metals were further mixed with a polyester compound which is fluid at 25° C. having a viscosity of about 100 poises (PN-350, a polyester plasticizer available from Adeka Argus Chemical Co.) in a weight ratio of 1:1, followed by bone-drying at 120° C. Into the line of the melted polymer, the mixture prepared above was injected at a rate of 2%, i.e. 1% of particulate metals (metallic copper: 0.9% and metallic silver: 0.1%) and 1% of the polyester compound, by weight based on the polymer flow. The polymer incorporating the mixture was kneaded through a 40-element static mixer made by Kenics Co. and extruded through a roundhole nozzle into filaments. The filaments thus spun was drawn by roller-plate system under the usual conditions to give a multifilament yarn of 75 deniers/36 filaments. The yarn was processed into a knit fabric and the knit fabric was subjected to the above-described washing and tearing test. The antimicrobial function of specimen before the test and that after 10 cycles of 8-hour wearing and one washing were evaluated. The bacteria reduction ratio was at least 99% before the test and 84.2% after 10 cycles of 8-hour wearing and one washing, which were both excellent.

Separately, a drawn yarn of 20 deniers/4 filaments was prepared in the same manner. The drawn yarn was combined with a nylon 6 drawn yarn in a ratio of about 5% to give a textured yarn. The thus obtained yarn was knitted into socks. The socks thus prepared were evaluated for an antimicrobial function. The bacteria reduction ratio measured on the socks before the test and that after 10 washings were 85.4% and 98.2% respectively, clearly demonstrating that the sample maintains fully satisfactory antimicrobial function.

COMPARATIVE EXAMPLE 1

Example 1 was repeated except for using as a polyester compound one comprising principally adipic acid and 1,4-butanediol, to make a yarn. The yarn thus obtained had a low antimicrobial function. During the spinning process, deposits accumulated on the spinneret surface, and filament breakage occurred frequently. The drawability was not good.

COMPARATIVE EXAMPLE 2

Example 1 was repeated except for using as a dispersion medium a organophosphorus compound derived from resorcinol and phenyl phosphate, which is fluid at room temperature and has a viscosity of 35 poises, to make a yarn. The yarn thus obtained had a low antimicrobial function and, particularly, exhibited a largely decreased antimicrobial function after a large number of cycles of wearing and washing.

COMPARATIVE EXAMPLE 3

The same mixture of particulate metallic copper and particulate metallic silver as in Example 1 was homogeneously dispersed in ethylene glycol, and the dispersion was subjected to an esterification reaction with terephthalic acid in the usual manner. The ester thus obtained was then polycondensed to give a polyethylene terephthalate of pellet form containing 1% by weight of the mixed particulate metals and having an $[\eta]$ of 0.70. The pellets thus obtained was fed to an extruder and spun through a spinneret having 36 holes each with a diameter of 0.2 mm at a spinning temperature of 300° C. and a spinning rate of 1000 m/min. The obtained yarn as spun was drawn under the usual conditions into a multifilament yarn of 75 deniers/36 filaments. Then the yarn was processed into a knit fabric and the fabric was evaluated for the antimicrobial function before washing and after 10 cycles of wearing and washing. The bacteria reduction ratios were at low levels. During the yarn production process, spinnability and drawability were not good due to frequent filament breakages.

COMPARATIVE EXAMPLE 4

Example 1 was repeated except for using as a dispersion medium a polyester compound derived from adipic acid and 1,3-butanediol, which was fluid at room temperature and had a viscosity of 5 poises, to prepare a yarn. The obtained yarn had a low level of antimicrobial function.

COMPARATIVE 5

Example 1 was repeated except for using as a dispersion medium a viscous liquid of a random copolymer of propylene oxide and ethylene oxide (PO.EO copolymer) in a ratio of 25:75 which was fluid at room temperature and had a viscosity of 200 poises, to prepare a yarn. Though the obtained yarn had a satisfactory antimicrobial function initially, it was drastically lowered after the wearing and washing test.

COMPARATIVE EXAMPLE 6

A taffeta fabric was prepared using a polyethylene terephthalate yarn (drawn, 50 deniers/36 filaments). A commercially available antimicrobial textile treating agent, which is a 50% methanol solution of a compound of the formula:

was diluted to 1 g/l aqueous solution. The above polyester fabric was dipped in the prepared solution at 100° C. for 30 minutes. The fabric was then dewatered and dried such that the antimicrobial agent remains in the polyester fabric in an amount of 1% solid owf. Evaluation for the antimicrobial function revealed that while the bacteria reduction ratio was initially 83.0%, which was satisfactory, after the wearing and washing test it diminished to 3.0%, which indicates that almost no antimicrobial function was maintained.

EXAMPLES 2 THROUGH 7

A series of polyester fibers were obtained in a manner similar to that in Example 1 as below.

In Example 2, the particulate metallic copper was mixed with particulate zinc oxide having an average particle diameter of $0.5\mu$ in a ratio of 7:3, and the mixture was further mixed with the same polyester compound as in Example 1 in a weight ratio of 1:1. The thus obtained mixture was added to a polyester in an amount of 2.0% by weight, i.e. 1% by weight of the mixed particulate metals (metallic copper 0.7% by weight and zinc oxide 0.3% by weight) and 1% by weight of the polyester compound.

In Example 3, Example 1 was repeated except for changing the metallic copper to cupric oxide to obtain a polyester fiber.

In Examples 4 through 6, Example 1 was repeated except for changing the weight ratio of the antimicrobial metals and the dispersion medium and the amount of the total additives added to obtain corresponding polyester fibers. In Example 7, Example 1 was repeated except for changing the polyester compound to one having a viscosity of 45 poises.

All the yarns obtained above had a satisfactory antimicrobial function.

EXAMPLE 8

A polyethylene terephthalate having an $[\eta]$ of 0.68 was extruded through an extruder. Separately, a mixture was prepared by first mixing particulate metallic copper having an average particle diameter of $0.3\mu$ and particulate metallic silver having an average particle diameter of $0.5\mu$ in a weight ratio of 9:1, and then the mixed metals were further mixed with a polyester compound which was fluid at 25° C. having a viscosity of about 100 poises in a weight ratio of 1:1. Into the line of the melt polymer, the mixture prepared above was injected at a ratio of 2% by weight. The polymer incorporating the mixture was kneaded through a 30-element static mixer made by Kenics Co. A composite fiber spinning was conducted with the thus obtained polymer as a sheath component and a polyester having an $[\eta]$ of 0.65 extruder through another extruder as a core component in a sheath/core ratio of 50/50 by weight through a round-hole nozzle with a L/D of 2. The yarn thus spun was drawn in the usual way to give a multifilament yarn of 75 deniers/36 filaments. It was confirmed that the yarn had a satisfactory antimicrobial function.

EXAMPLE 9

Example 1 was repeated except for using nylon 6 (Type 1013B made by Ube Industries) to obtain a nylon multifilament yarn of 50 deniers/36 filaments. The antimicrobial function of the thus obtained yarn was satisfactory.

EXAMPLES 10 THROUGH 12

A series of polyester fibers comprising mixed particulate metals and a polyester compound were obtained in the same manner as in Example 1 as follows.

In Example 10, with the same polyester compound as in Example 1, Example 1 was repeated except for changing the metallic silver to zinc oxide having an average particle diameter of $0.5\mu$.

In Example 11, Example 10 was repeated except for changing the mixing ratio of the antimicrobial metals and the dispersion medium.

Example 12 used a mixture of the particulate copper and particulate silver chloride having an average particle diameter of $0.5\mu$.

All of the yarns thus prepared exhibited a satisfactory durable antimicrobial function.

EXAMPLES 13 AND 14

Polyester fibers comprising mixed particulate metals and a polyester compound were obtained in the same manner as in Example 1 as follows.

In Example 13, with the same polyester compound as in Example 1, Example 1 was repeated except for changing the metallic silver to ferric oxide (III) having an average particle diameter of $0.5\mu$.

Example 14 used a mixture of the particulate copper and 2 particulate aluminum having an average particle diameter of $0.5\mu$.

Both of the yarns thus prepared exhibited a satisfactory durable antimicrobial function.

The conditions and the evaluation results in Examples 1 through 14 and Comparative Examples 1 through 6 are summarized in Table 1.

| | Antimicrobial metal powder | | | Additive weight ratio Antimicrobial metal powder:dispersion medium | Dispersion medium employed | | | | Spinning conditions | | | | |
|---|---|---|---|---|---|---|---|---|---|---|---|---|---|
| | | | weight ratio A:B | | kind | melting point | viscosity (25° C.) poise | polymer | amount of additive added | | | No. of elements of static mixer | homogeneous fiber/composite fiber |
| | A | B | | | | | | | total wt % | anti-microbial metal wt % | dispersion medium wt % | | |
| Ex. 1 | metallic cupper | metallic silver | 9:1 | 50:50 | polyester | liquid | 100 | polyethylene terephthalate | 2.0 | 1.0 | 1.0 | 40 | homogeneous |
| Ex. 2 | metallic cupper | zinc oxide | 7:3 | 50:50 | polyester | liquid | 100 | polyethylene terephthalate | 2.0 | 1.0 | 1.0 | 40 | homogeneous |
| Comp. Ex. 1 | metallic cupper | metallic silver | 9:1 | 50:50 | polyester | 65° C. | solid | polyethylene terephthalate | 2.0 | 1.0 | 1.0 | 40 | homogeneous |
| Comp. Ex. 2 | metallic cupper | metallic silver | 9:1 | 33:67 | organic phosphorous compound | liquid | 35 | polyethylene terephthalate | 4.2 | 1.4 | 2.8 | 40 | homogeneous |
| Comp. Ex. 3 | metallic cupper | metallic silver | 9:1 | 100:0 | — | — | — | polyethylene terephthalate | 1.0 | 1.0 | — | — | — |
| Comp. Ex. 4 | metallic cupper | metallic silver | 9:1 | 50:50 | polyester | liquid | 5 | polyethylene terephthalate | 2.0 | 1.0 | 1.0 | 40 | homogeneous |
| Comp. Ex. 5 | metallic cupper | metallic silver | 9:1 | 33:67 | PO.EO copolymer | liquid | 200 | polyethylene terephthalate | 7.5 | 2.5 | 5.0 | 40 | homogeneous |
| Comp. Ex. 6 | — | — | — | after-added | — | — | — | polyethylene terephthalate | — | — | — | — | — |
| Ex. 3 | cupric oxide | metallic silver | 9:1 | 50:50 | polyester | — | 100 | polyethylene terephthalate | 2.0 | 1.0 | 1.0 | 40 | homogeneous |
| Ex. 4 | metallic cupper | metallic silver | 9:1 | 10:90 | polyester | — | 100 | polyethylene terephthalate | 3.0 | 0.3 | 2.7 | 30 | homogeneous |
| Ex. 5 | metallic cupper | metallic silver | 9:1 | 70:30 | polyester | — | 100 | polyethylene terephthalate | 3.6 | 2.5 | 1.1 | 30 | homogeneous |
| Ex. 6 | metallic cupper | metallic silver | 9:1 | 5:95 | polyester | — | 100 | polyethylene terephthalate | 4.2 | 0.2 | 4.0 | 30 | homogeneous |
| Ex. 7 | metallic cupper | metallic silver | 9:1 | 50:50 | polyester | — | 45 | polyethylene terephthalate | 2.0 | 1.0 | 1.0 | 30 | homogeneous |
| Ex. 8 | metallic cupper | metallic silver | 9:1 | 50:50 | polyester | — | 100 | polyethylene terephthalate | 2.0 | 1.0 | 1.0 | 30 | composite |
| Ex. 9 | metallic cupper | metallic silver | 9:1 | 50:50 | polyester | — | 100 | Nylon-6 | 2.0 | 1.0 | 1.0 | 40 | homogeneous |
| Ex. 10 | metallic cupper | zinc oxide | 2:8 | 50:50 | polyester | — | 100 | polyethylene terephthalate | 2.0 | 0.7 | 1.3 | 40 | homogeneous |
| Ex. 11 | metallic cupper | zinc oxide | 2:8 | 33:67 | polyester | — | 100 | polyethylene terephthalate | 2.0 | 1.0 | 1.0 | 40 | homogeneous |
| Ex. 12 | metallic cupper | zinc oxide | 9:1 | 50:50 | polyester | — | 100 | polyethylene terephthalate | 2.0 | 1.0 | 1.0 | 40 | homogeneous |
| Ex. 13 | metallic cupper | ferric oxide | 9:1 | 50:50 | polyester | — | 100 | polyethylene terephthalate | 2.0 | 1.0 | 1.0 | 40 | homogeneous |
| Ex. 14 | metallic cupper | metallic aluminum | 9:1 | 50:50 | polyester | — | 100 | polyethylene terephthalate | 2.0 | 1.0 | 1.0 | 40 | homogeneous |

TABLE 1 (2)

| | Antimicrobial function | | Overall evaluation | | |
| | | | operatability | | |
| | Initial | after 10 cycles of 1-day wearing and one washing | spinn-ability | draw-ability | quality evaluation |
| --- | --- | --- | --- | --- | --- |
| Ex. 1 | at least 99 | 84.2 | ○ | ○ | Antimicrobial function well maintained for a long-period use. |
| Ex. 2 | 82.3 | 98.9 | ○ | ○ | Antimicrobial function well maintained for a long-period use. |
| Comp. Ex. 1 | 35.0 | 4.5 | Δ | Δ | Antimicrobial function deteriorated. |
| Comp. Ex. 2 | 46.7 | 4.3 | ○ | ○ | Antimicrobial function deteriorated. |
| Comp. Ex. 3 | 41.0 | 2.1 | ○ | x | Antimicrobial function deteriorated. |
| Comp. Ex. 4 | 36.0 | 13.3 | Δ | Δ | Antimicrobial function deteriorated. |
| Comp. Ex. 5 | 87.8 | 9.8 | ○ | ○ | Antimicrobial function not well maintained for a long-period use. |
| Comp. Ex. 6 | 83.0 | 3.0 | — | — | Antimicrobial function not well maintained for a long-period used. (hand hardened) |
| Ex. 3 | 78.2 | 80.4 | ○ | ○ | Antimicrobial function well maintained for a long-period use. |
| Ex. 4 | 77.5 | 75.0 | ○ | ○ | Antimicrobial function well maintained for a long-period use. |
| Ex. 5 | 97.0 | 84.0 | ○ | ○ | Antimicrobial function well maintained for a long-period use. |
| Ex. 6 | 80.0 | 74.8 | ○ | ○ | Antimicrobial function well maintained for a long-period use. |
| Ex. 7 | 80.5 | 71.1 | ○ | ○ | Antimicrobial function well maintained for a long-period use. |
| Ex. 8 | 88.1 | 81.0 | ○ | ○ | Antimicrobial function well maintained for a long-period use. |
| Ex. 9 | 75.9 | 79.2 | ○ | ○ | Antimicrobial function well maintained for a long-period use. |
| Ex. 10 | 78.8 | 89.9 | ○ | ○ | Antimicrobial function well maintained for a long-period use. |
| Ex. 11 | 85.5 | 85.0 | ○ | ○ | Antimicrobial function well maintained for a long-period use. |
| Ex. 12 | 80.5 | 79.8 | ○ | ○ | Antimicrobial function well maintained for a long-period use. |
| Ex. 13 | 83.0 | 87.0 | ○ | ○ | Antimicrobial function well maintained for a long-period use. |
| Ex. 14 | 85.0 | 90.0 | ○ | ○ | Antimicrobial function well maintained for a long-period use. |

EXAMPLE 15

Example 1 was repeated except for changing the particulate metallic copper to particulate zinc oxide having an average particle diameter of 0.3μ to obtain a white polyester multifilament yarn of 75 deniers/36 filaments. The yarn was processed into a knit fabric and the knit fabric was subjected to the aforedescribed washing and wearing test. The antimicrobial function of the specimen before the test and that after 10 cycles of 8-hour wearing and one washing were evaluated. The bacteria reduction ratio was at least 99% before the test and 75.4% after 10 cycles of 8-hour wearing and one washing, which were both excellent.

Separately, a drawn yarn of 20 deniers/4 filaments was prepared in the same manner. The drawn yarn was combined with a nylon 6 drawn yarn in a ratio of about 5% to give a textured yarn. The thus obtained yarn was knitted into socks. The socks thus prepared were evaluated for antimicrobial function. The bacteria reduction ratio measured on the socks before the test and that after 10 washings were 85.0% and 91.0%, respectively, proving that the sample maintains a fully satisfactory antimicrobial function.

EXAMPLE 16

Example 1 was repeated except for changing the particulate metallic copper to particulate metallic zinc having an average particle diameter of 0.3μ to obtain a multifilament yarn of 75 deniers/36 filaments. The antimicrobial function of the thus obtained yarn was satisfactory.

EXAMPLES 17 THROUGH 19

Examples 4 through 6 were repeated except for changing the particulate metallic copper to the particulate zinc oxide used in Example 15 and changing the number of elements of the static mixer to 40.

All of the white polyester fibers thus obtained had a satisfactory antimicrobial function.

EXAMPLE 20

Example 15 was repeated except for changing the polyester compound to one having a viscosity at 25° C. of 45 poises.

The antimicrobial function of the thus obtained white polyester yarn was satisfactory.

EXAMPLE 21

Example 9 was repeated except for changing the particulate metallic copper to particulate zinc oxide having an average particle diameter of $0.3\mu$. The antimicrobial function of the thus obtained white nylon fiber was satisfactory.

EXAMPLE 22

Example 10 was repeated except for changing the particulate metallic copper to particulate zinc oxide having an average particle diameter of $0.3\mu$ and the particulate zinc oxide used in Example 10 to particulate metallic silver, respectively, with the weight ratio, (A:B), of 5:5. The antimicrobial function of the thus obtained white polyester fiber was satisfactory.

EXAMPLES 23 AND 24

Examples 13 and 14 were repeated except for changing the particulate metallic copper to the particulate zinc oxide used in Example 15. The thus obtained white polyester fibers had a satisfactory antimicrobial function.

EXAMPLE 25

Example 8 was repeated except for changing the particulate metallic copper to the particulate zinc oxide used in Example 15. The antimicrobial function of the thus obtained white sheath-core composite polyester fiber was satisfactory.

EXAMPLE 26

Example 25 was repeated except for changing the sheath component to nylon 6. The antimicrobial function of the thus obtained white sheath-core composite fiber was satisfactory.

The conditions and the evaluation results in Examples 15 through 26 are summarized in Table 2.

Obviously, numerous modifications and variations of the present invention are possible in light of the above teachings. It is therefore to be understood that within the scope of the appended claims, the invention may be practiced otherwise than as specifically described herein.

TABLE 2 (1)

| | Antimicrobial metal powder | | Additive weight ratio Antimicrobial metal powder:dispersion medium | Dispersion medium employed | | | Spinning conditions | | | | |
|---|---|---|---|---|---|---|---|---|---|---|---|
| | | weight ratio A:B | | | | viscosity (25° C.) poise | | amount of additive added | | | |
| | A | B | | kind | melting point | | polymer | total wt % | anti- microbial metal wt % | disper- sion medium wt % | No. of elements of static mixer | homogeneous fiber/ composite fiber |
| Ex. 15 | zinc oxide | metallic silver | 9:1 | 50:50 | polyester | liquid | 100 | polyethylene terephthalate | 2.0 | 1.0 | 1.0 | 40 | homogeneous |
| Ex. 16 | metallic zinc | metallic silver | 9:1 | 50:50 | polyester | liquid | 100 | polyethylene terephthalate | 2.0 | 1.0 | 1.0 | 40 | homogeneous |
| Ex. 17 | zinc oxide | metallic silver | 9:1 | 10:90 | polyester | liquid | 100 | polyethylene terephthalate | 3.0 | 0.3 | 2.7 | 40 | homogeneous |
| Ex. 18 | zinc oxide | metallic silver | 9:1 | 70:30 | polyester | liquid | 100 | polyethylene terephthalate | 3.6 | 2.5 | 1.1 | 40 | homogeneous |
| Ex. 19 | zinc oxide | metallic silver | 9:1 | 5:95 | polyester | liquid | 100 | polyethylene terephthalate | 4.2 | 0.2 | 4.0 | 40 | homogeneous |
| Ex. 20 | zinc oxide | metallic silver | 9:1 | 50:50 | polyester | liquid | 45 | polyethylene terephthalate | 2.0 | 1.0 | 1.0 | 40 | homogeneous |
| Ex. 21 | zinc oxide | metallic silver | 9:1 | 50:50 | polyester | liquid | 100 | Nylon-6 | 2.0 | 1.0 | 1.0 | 40 | homogeneous |
| Ex. 22 | zinc oxide | metallic silver | 5.5 | 50:50 | polyester | liquid | 100 | polyethylene terephthalate | 2.0 | 1.0 | 1.0 | 40 | homogeneous |
| Ex. 23 | zinc oxide | metallic aluminum | 9:1 | 50:50 | polyester | liquid | 100 | polyethylene terephthalate | 2.0 | 1.0 | 1.0 | 40 | homogeneous |
| Ex. 24 | zinc oxide | ferric oxide | 9:1 | 50:50 | polyester | liquid | 100 | polyethylene terephthalate | 2.0 | 1.0 | 1.0 | 40 | homogeneous |
| Ex. 25 | zinc oxide | metallic silver | 9:1 | 50:50 | polyester | liquid | 100 | polyethylene terephthalate | 2.0 | 1.0 | 1.0 | 30 | composite |
| Ex. 26 | zinc oxide | metallic silver | 9:1 | 50:50 | polyester | liquid | 100 | Nylon-6 | 2.0 | 1.0 | 1.0 | 30 | composite |

TABLE 2 (2)

| | Antimicrobial function after 10 cycles of 1-day wearing and one washing | | Overall evaluation | | |
|---|---|---|---|---|---|
| | Initial | | operatability | | quality evaluation |
| | | | spinn-ability | draw-ability | |
| Ex. 15 | at least 99 | 75.4 | ○ | ○ | Antimicrobial function well maintained for a long-period use. |
| Ex. 16 | 90.7 | 80.6 | ○ | ○ | Antimicrobial function well maintained for a long-period use. |
| Ex. 17 | 73.0 | 81.0 | ○ | ○ | Antimicrobial function well maintained for a long-period use. |
| Ex. 18 | 92.0 | 93.0 | ○ | ○ | Antimicrobial function well maintained for a long-period use. |
| Ex. 19 | 71.0 | 77.5 | ○ | ○ | Antimicrobial function well maintained for a long-period use. |
| Ex. 20 | 81.9 | 70.0 | ○ | ○ | Antimicrobial function well maintained for a long-period use. |
| Ex. 21 | 75.0 | 72.0 | ○ | ○ | Antimicrobial function well maintained for a long-period use. |
| Ex. 22 | at least 99 | 91.1 | ○ | ○ | Antimicrobial function well maintained for a long-period use. |
| Ex. 23 | 85.0 | 73.9 | ○ | ○ | Antimicrobial function well maintained for a long-period use. |
| Ex. 24 | 74.3 | 81.0 | ○ | ○ | Antimicrobial function well maintained for a long-period use. |
| Ex. 25 | 90.0 | 95.2 | ○ | ○ | Antimicrobial function well maintained for a long-period use. |
| Ex. 26 | 73.0 | 78.0 | ○ | ○ | Antimicrobial function well maintained for a long-period use. |

What is new and desired to be secured by Letters Patent of the U.S. is:

1. An antimicrobial fiber having high durability, which comprises a thermoplastic polymer having a melting point of at least 200° C. and which incorporates therein a disperse mixture of:
   (A) fine particles of at least one member selected from the group consisting of metallic copper and metallic zinc and compounds of the foregoing having an average particle diameter of not more than 5 μm;
   (B) fine particles of at least one member selected from the group consisting of metallic aluminum, metallic silver, metallic iron and metallic zinc and compounds of the foregoing and excluding (A), said fine particles having an average particle diameter of not more than 5 μm; and
   (C) a liquid polyester having a melting point of not higher than 10° C. and a viscosity at 25° C. of at least 10 poises, the contents of said (A), (B) and (C) in said fiber satisfying the following formulas (1) through (4):
   (1) (A)+(B)=0.1 to 10% by weight based on the weight of said fiber;
   (2) (C)=0.1 to 10% by weight based on the weight of said fiber;
   (3) ((A)+(B)):(C)=5:95 to 80:20 by weight, and
   (4) (A):(B)=1:99 to 99:1 by weight.

2. The antimicrobial fiber of claim 1, wherein said fine particles a) and b) have an average particle diameter of less than about 1μ.

3. The antimicrobial fiber of claim 1, wherein said thermoplastic polymer comprises a polyester or a polyamide.

4. The antimicrobial fiber of claim 3, wherein said polyester is a fiber-forming polyester derived from an aromatic acid selected from the group consisting of terephthalic acid, isophthalic acid, naphthalene-2,6-dicarboxylic acid, phthalic acid and α,β-(4-carboxyphenoxy) ethane; or an aliphatic acid selected from the group consisting of adipic acid and sebacic acid and esters of the same; and a diol selected from the group consisting of ethylene glycol, diethylene glycol, 1,4-butanediol, neopentyl glycol, cyclohexane-1,4-dimethanol, polyethylene glycol and polytetramethylene glycol.

5. The antimicrobial fiber of claim 3, wherein said polyester has at least 80 mol% of polyethylene terephthalate and polybutylene terephthalate.

6. The antimicrobial fiber of claim 3, wherein said polyester has a melting point of at least 200° C.

7. The antimicrobial fiber of claim 3, wherein said polyamide has a melting point of at least 200° C.

8. The antimicrobial fiber of claim 7, wherein said polyamide comprises substantially nylon 6, nylon 6,6 or meta-xylylenediamine nylon.

9. The antimicrobial fiber of claim 3, wherein said thermoplastic polymer of polyester or polyamide comprises yarns of a form resembling a pentagon or a hexagon, or filaments having a cross-sectional shape of trilobal, T-shape, tetralobal, pentalobal, hexalobal, heptalobal or octalobal.

* * * * *